United States Patent [19]

Burk

[11] Patent Number: 4,571,229
[45] Date of Patent: Feb. 18, 1986

[54] LARGE BEARING AREA POWER TRANSMISSION AND MATERIAL HANDLING CHAIN

[75] Inventor: Robert G. Burk, S. Hadley, Mass.

[73] Assignee: Incom International Inc., Pittsburgh, Pa.

[21] Appl. No.: 740,164

[22] Filed: Jun. 3, 1985

Related U.S. Application Data

[63] Continuation of Ser. No. 560,442, Dec. 12, 1983, abandoned.

[51] Int. Cl.$^4$ ............................................. F16G 13/02
[52] U.S. Cl. .................................................... 474/231
[58] Field of Search ................ 474/218, 223, 230, 231

[56] References Cited

U.S. PATENT DOCUMENTS 1,945,357  1/1934  Pierce ............................ 474/231 X
3,643,517  2/1972  Paul ..................................... 74/254
4,315,750  2/1982  Kawashima et al. ........... 474/231 X Primary Examiner—James A. Leppink
Assistant Examiner—Frank McKenzie
Attorney, Agent, or Firm—James C. Wray

[57] ABSTRACT

Chain having increased life is constructed similar to conventional power transmission and conveyor chain with the exception that the increased-life chain has enlarged bushing receiving openings in link plates.

8 Claims, 5 Drawing Figures

LARGE BEARING AREA POWER TRANSMISSION AND MATERIAL HANDLING CHAIN

This application is a continuation, of application Ser. No. 560,442, filed 12/12/83 now abandoned.

BACKGROUND OF THE INVENTION

Power transmission and conveyor chain has been used for more than two thousand years. Chain was used with lift buckets in the Third Century B.C. Leonardo da Vinci's drawings depict chains not unlike the present power and conveyor chains.

Power and conveyor chains have used standard pitches and widths and standard sizes of components, as described in American Chain Association manuals and in *Chains for Power Transmission and Material Handling Design and Applications Handbook,* published by the American Chain Association and edited by L. L. Faulkner and S. B. Menkes, Marcel Dekker, Inc., New York, 1982.

It is well known that, as chain wears, the chain length is extended. When chain fails, it either fails by shear in the pins or links or by tensile stress in the links. Either deformation, extension or parting may cause chain failure and end usefulness of a particular chain or its parts.

Since one common chain failure is found in link fatigue or creep or extension, it has been heretofore thought important to keep the links strong by reducing the holes formed in the links to receive pins or bushings.

This mental bent for strengthening chains and preventing failures and extending use is reflected in the standards of chain and component sizes for power transmission and conveyor chains, indicated in the American Chain Association handbook.

Extending chain life and preventing premature failure have been the objects of engineers and chain manufacturers for a long time.

One patent which describes particular chain constructions in seeking an optimum of life and strength is U.S. Pat. No. 3,054,300. Another patent which seeks to optimize strength and weight is an older U.S. Pat. No. 2,182,443.

Present chain used today is manufactured according to standards adopted by the American National Standards Institute and developed, revised and updated by the American Chain Association.

SUMMARY OF THE INVENTION

The present invention provides a chain having increased wear characteristics, surprisingly, by removing material from the link plates. Enlarging holes in the link plates enlarges the bearing area of the bushings in the holes. The enlarged bearing area is believed to be responsible for the reduced elongation and increased life of the chain.

In a preferred embodiment, chain apparatus has plural plates, plural pins and plural bushings. The plates have bushing receiving ends mounted in bushing receiving openings of spaced opposite plates, pins extending through the bushings and having ends mounted in pin receiving openings of spaced opposite plates.

The bushings freely rotate on the pins. Ends of the plates are rounded in radii. Bushing receiving openings have radii greater than one-half of corresponding radii of rounded ends of the plates.

Preferably, the bushing receiving openings have radii approximately two-thirds of corresponding radii of rounded ends of the plates.

The preferred chain apparatus is chain having plural spaced bushing links and plural spaced pin links respectively connecting the bushing links in spaced alternating relationships of bushing link, pin link, bushing link and pin link. Each bushing link has first and second spaced opposite bushing plates, and each plate has first and second bushing receiving openings. First and second parallel bushings extend into the first and second openings in the opposite bushing plates, and ends of the bushings are secured in the openings for holding each bushing link in assembled condition. Each pin link has first and second spaced opposite pin plates positioned outward of end portions of bushing plates on adjacent bushing links. Each pin plate has first and second pin receiving openings. First and second pins extend respectively through first and second openings in one pin plate, through second and first bushings respectively in adjacent bushing links, and through first and second openings in the second pin plate. The pins fit within the bushings for free rotary bearing motion between the pins and the bushings. Ends of the pins are fixed in the pin plates for rigidly connecting elements of the pin links. The pin links and bushing links rotate about each other on the pins and bushings. The pin plates and bushing plates have rounded ends which facilitate relative rotation of the links. The bushing plates have bushing receiving openings with radii greater than one-half of corresponding radii of bushing plate ends.

Preferably, the bushing receiving openings in the bushing plates have radii about two-thirds of corresponding radii of the bushing plate ends.

Preferably, the bushing receiving openings in the bushing plates have radii about from greater than one-half to about two-thirds of corresponding radii of bushing plate ends.

In preferred embodiments, the pin plates have pin receiving openings with radii which are about one-half of corresponding radii of rounded ends of the pin plates.

In one preferred embodiment, the pin plates and bushing plates have substantially similar outer dimensions.

In another preferred embodiment, the bushing plates have greater thickness than the pin plates.

Preferably, the bushing plates have a thickness greater than 110% of a thickness of the pin plates. Preferably, the bushing plates have a thickness about 133% of the pin plates.

In one embodiment of the invention, the plates have offset sections with first inwardly offset sections having bushing receiving openings and second outward offset sections having pin receiving openings, the second offset sections being sufficiently offset to receive first inward offset sections of plates of connected links.

In one preferred embodiment, plural rollers are mounted externally on the bushings for free rotation of the rollers on the bushings.

A preferred method of reducing elongation in power transmission and conveyor chains comprises increasing bearing area of elements of the chains. The preferred method increases bushing and pin diameters.

A preferred method of increasing wear and reducing elongation in use of power transmission chains and material handling chains comprises increasing radii of bushing receiving openings in bushing link plates so that the bushing receiving openings in the bushing link plates occupy greater than one-half of corresponding dimensions of the bushing link plates.

In the preferred method, bushing receiving openings in the bushing link plates are increased to about two-thirds of corresponding transverse dimensions of the bushing link plates.

The bushing link plates are increased in thickness with respect to pin link plates in one preferred embodiment.

In the preferred method of increasing chain strength, elongation of chain is reduced by a factor of greater than 2:1 as compared with preexisting chain when continously operating chains of the present invention with relatively large bushing receiving openings in bushing links and chains of the prior art with standard bushing receiving openings in bushing links.

These and other and further objects and features of the invention are apparent in the disclosure which includes the above and ongoing specification and the drawings.

DETAILED DESCRIPTION OF THE DRAWINGS

Figure 1:
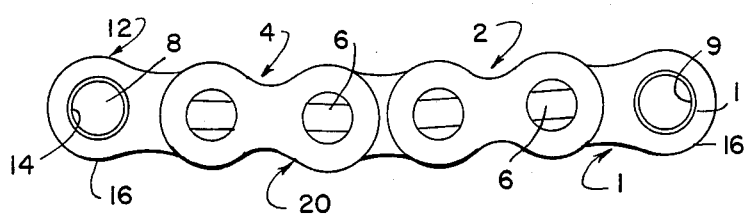
FIG. 1 is a side elevation of a preferred chain of the present invention.
Figure 2:
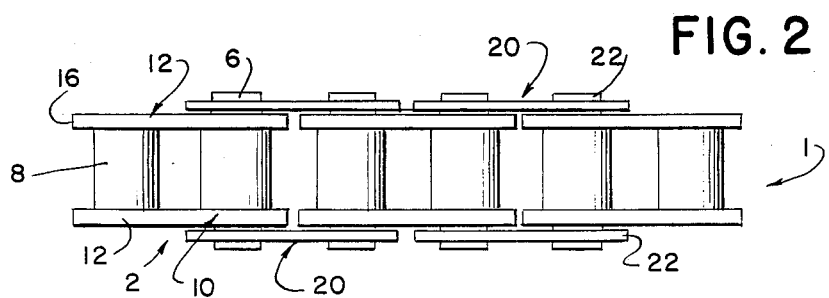
FIG. 2 is a plan view of the preferred chain shown in FIG. 1.

Referring to FIGS. 1 and 2, a chain of the present invention is generally indicated by the numeral 1. The chain has a plurality of links 2, each having parallel link plates 4 joined by pins 6 and bushings 8.

The links 2 comprise alternating bushing links 10 and pin links 20. Bushing links 10 have first and second parallel bushing link plates 12 with bushing receiving openings 14 and rounded ends 16. Ends of bushings 8 are fixed in the openings 14 in the respective bushing link plates.

Pin links 20 comprise parallel pin plates 22 with openings 24 at opposite ends thereof for receiving the pins 6. Ends of the pins 6 are fixed in the respective openings 24 of the pin plates after the pins are inserted through respective bushings 8 in spaced bushing links 10. Bushing links 10 and pin links 20 freely rotate around axes of pins 6 by virtue of the loose rotary bearing contact of pins 6 and bushings 8. Outer surfaces of the bushings contact sprocket teeth as the chains are driven along their predetermined paths.

The high bearing area between the inner surface 9 of the bushings 8 and the outer surfaces of the pins 6 reduces unwanted elongation of the chain over extended operating periods. In addition, the high bearing areas of the outer surfaces 7 of the bushings 8 distribute force over the bushing receiving holes 14 and, thus, over the rounded end portions 16 of the bushing link plates 12, reducing fatigue, creep and elongation of the bushing link plates 12.

One embodiment of the invention, as shown in FIG. 2, uses standard pin link plates and heavy bushing link plates. The pin link plate thickness is approximately 0.094 inches, and the bushing link plate thickness is approximately 0.125 inches. Alternatively, standard bushing link plate thickness could be used, or both bushing link plates and pin link plates may be of the heavier thickness.

In the preferred embodiment of the chain shown in the drawings, the pitch, which is the distance between center lines of the pins or of the bushings, is $\frac{3}{4}$ inch. The outer bushing diameter is approximately 15/32 inch. The width of the chain, which is the distance between insides of the bushing link plates, is $\frac{1}{2}$ inch, and the pin diameter is about 0.312 inches. Pin diameter and bushing inner diameter may be varied in keeping with providing sufficient clearance between the pin and bushing to provide adequate lubrication and free rotation.

Varying pitches and widths of chain may be used with varied bushing diameters and pin diameters and link plate thicknesses while attaining the advantages of the present invention.

The present invention enables heavy load, high speed operation of a chain without the attendent chain elongation, which requires replacement of standard chains.

Increasing of the bearing areas to reduce elongation and extend life usually, but not necessarily, requires elimination of rollers. The elimination of rollers may cause increase of chain noise, which may be unnoticed in high noise environments, such as in can manufacturing plants. Insulation may be used at major noise sources, such as around sprockets, to reduce or eliminate any increased noise.

Elimination of rollers may increase sprocket wear. Traditionally, sprockets last longer than chain and have longer life intervals than chain.

With the chain of the present invention, while sprocket life may be reduced, the replacing of sprockets is a relatively easy and inexpensive procedure.

Figure 3:
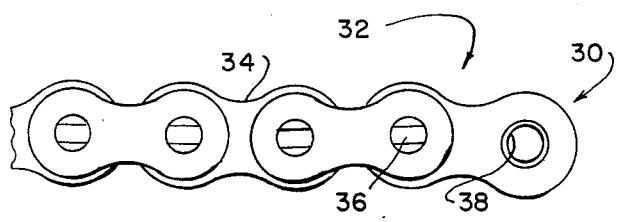
FIG. 3 is a side elevation of a prior art chain.
Figure 4:
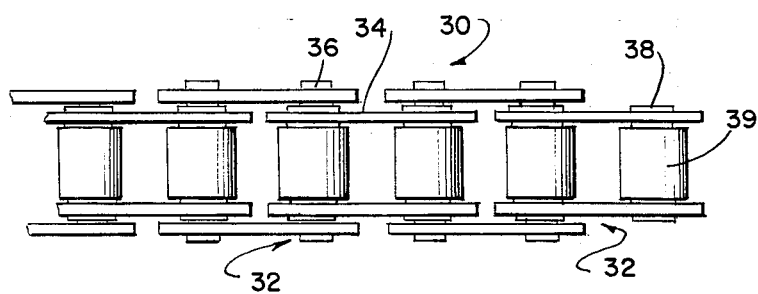
FIG. 4 is a side elevation of the prior art chain shown in FIG. 3.

FIGS. 3 and 4 show standard roller chain of $\frac{3}{4}$ inch pitch, which the chain of the present invention replaces. The standard prior art chain 30 has standard links 32 and standard link plates 34 with standard pins 36 and standard bushings 38 and rollers 39 mounted externally on the bushings 38 between opposite bushing link plates.

As shown in FIGS. 3 and 4, the standard bushings and standard pins have a low bearing area, and the bushings have a low bearing area within the rounded ends of the bushing link plates, which low bearing areas are believed to account for chain elongation, necessitating chain replacement.

Figure 5:
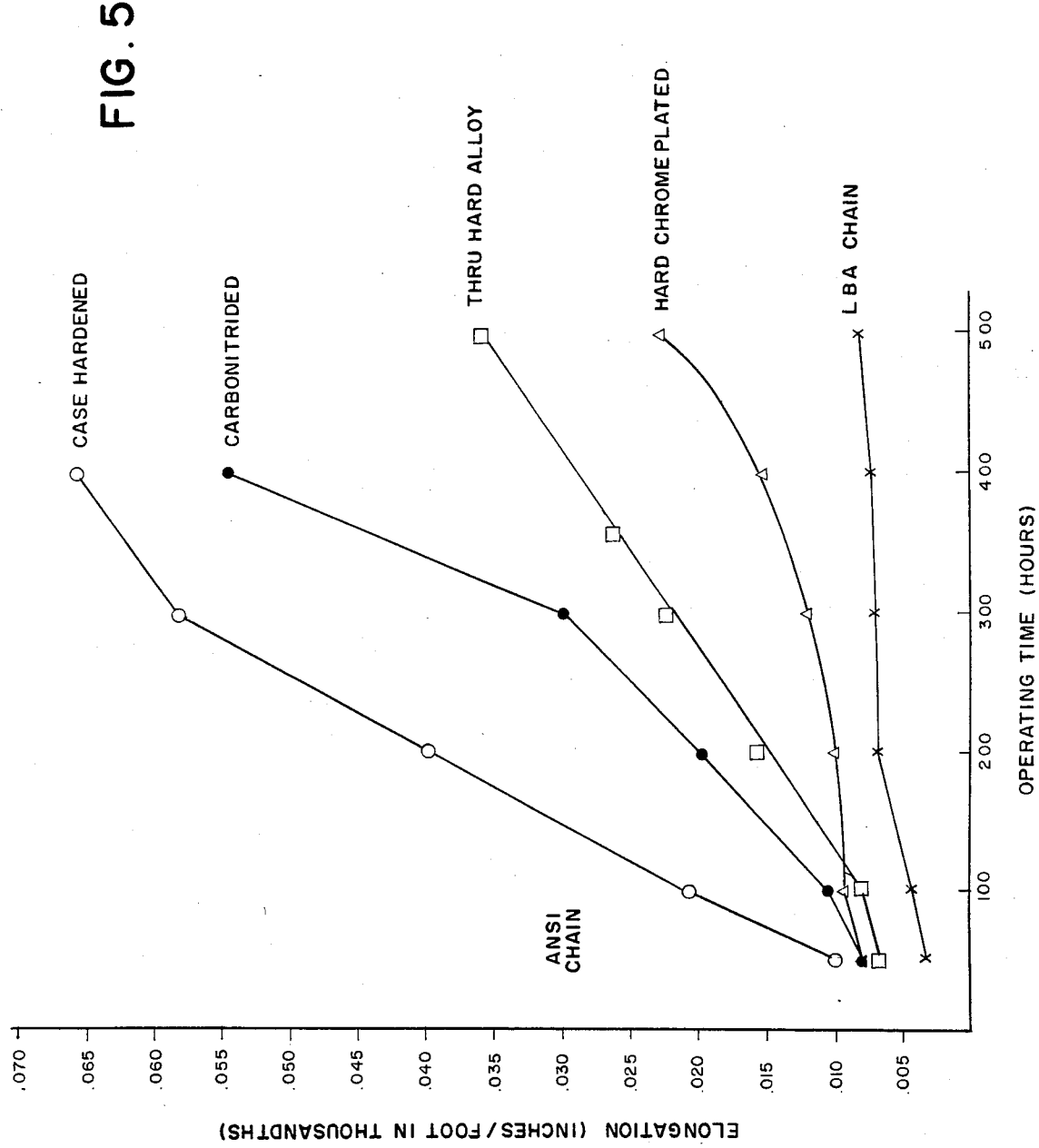
FIG. 5 is a graphic comparison of chain elongation, comparing chains of standard pitch at uniform loads and speeds and operating time.

FIG. 5 compares four standard ANSI chains with a large bearing area chain of the present invention. All of the chains are $\frac{3}{4}$ inch pitch chain operating at 600 pounds load at a speed of 375 feet per minute. All of the chains are given an initial lubrication only.

As shown in FIG. 5, after 500 hours of operation under the same load and speed as the other chains, the LBA chain of the present invention has an elongation of slightly in excess of 5/1000 inch per foot, which is acceptable and does not require chain replacement.

In contrast, standard $\frac{3}{4}$ inch pitch, hard chromeplated ANSI chain has a greater than 0.020 inch per foot elongation after 500 hours, and thru hard alloy chain has an elongation greater than 0.035 inch per foot. Standard carbonitrided chain had an unacceptable elongation of greater than 0.055 inch per foot after 400 hours of operation, and case hardened chain had an unacceptable elongation of greater than 0.065 inch per foot after 400 hours of operation.

The present invention provides a chain with increased operating time, reducing chain replacement requirements measured by chain elongation. The increased chain life and reduced elongation is achieved by providing high bearing areas, by using increased bushing diameters and increased diameters of bushing receiving openings wherein the bushings and bushing receiving openings have radii greater than ½ of corresponding radii of rounded ends of bushing link plates and preferably have radii about two-thirds of corresponding radii of the bushing link plate ends. Preferred pins used in the pin links have diameters slightly less than the inner diameters of the bushings in a relationship commensurate with minimal clearance sufficient to provide lubrication and free rotation during operation.

While the invention has been described with reference to specific embodiments, modifications and variations of the invention are apparent without departing from the scope of the invention as defined in the claims.

I claim:

1. Chain apparatus comprising a chain having plural spaced bushing links and plural spaced pin links respectively connecting the bushing links in spaced alternating relationships of bushing link, pin link, bushing link and pin link, each bushing link having first and second spaced opposite bushing plates and each plate having first and second bushing receiving openings, and each bushing link having first and second parallel cylindrical bushings extending into the first and second openings in the opposite bushing plates, ends of the bushings being secured in the openings for holding each bushing link in assembled condition, and each pin link comprising first and second spaced opposite pin plates positioned outward of end portions of bushing plates on adjacent bushing links, each pin plate having first and second pin receiving openings and first and second pins extending respectively through first and second openings in one pin plate and through second and first bushings respectively in adjacent bushing links and through first and second openings in the second pin plate, the pins fitting within the bushings for free rotary bearing motion between the pins and the bushings and ends of the pins being fixed in the pin plates for rigidly connecting elements of the pin links and permitting the pin links and bushing links to rotate about each other on the pins and bushings, the pin plates and bushing plates having rounded ends which facilitate relative rotation of the links, wherein the bushing plates have bushing receiving openings having radii greater than one-half of corresponding radii of bushing plate ends, wherein the inner bushing surfaces and the pins have radii greater than one-half of corresponding radii of the rounded ends of both the bushing plates and pin plates.

2. The chain apparatus of claim 1 wherein the bushing receiving openings have radii approximately two-thirds of corresponding radii of rounded ends of the plates.

3. The chain apparatus of claim 1 wherein the plates have offset sections with first inwardly offset sections having bushing receiving openings and second outward offset sections having pin receiving openings, the second offset sections being sufficiently offset to receive first inward offset sections of plates of connected links.

4. The chain apparatus of claim 3 wherein the bushing receiving openings have radii about two-thirds of corresponding radii of the bushing plate ends.

5. The chain apparatus of claim 3 wherein the bushing receiving openings have radii about from greater than one-half to about two-thirds of corresponding radii of bushing plate ends.

6. The chain apparatus of claim 3 wherein the pin receiving openings have radii which are about one-half of corresponding radii of rounded ends of the pin plates.

7. The chain apparatus of claim 6 wherein the bushing receiving openings have radii about two-thirds of corresponding radii of the bushing plate ends.

8. The chain apparatus of claim 6 wherein the bushing receiving openings have radii about from greater than one-half to about two-thirds of corresponding radii of bushing plate ends.

* * * * *